United States Patent [19]

Foster et al.

[11] 4,217,557
[45] Aug. 12, 1980

[54] LASER EMISSION FROM PURELY CHEMICALLY GENERATED VIBRATIONALLY EXCITED HYDROGEN BROMIDE

[75] Inventors: Kenneth D. Foster, LacBeauport; Sara J. Arnold, Loretteville, both of Canada

[73] Assignee: Her Majesty the Queen in right of Canada, as represented by the Minister of National Defence, Ottawa, Canada

[21] Appl. No.: 912,406

[22] Filed: Jun. 5, 1978

[30] Foreign Application Priority Data

Apr. 5, 1978 [CA] Canada ............................ 300541

[51] Int. Cl.$^2$ .......................................... H01S 3/22
[52] U.S. Cl. .......................................... 331/94.5 G
[58] Field of Search .................... 331/94.5 G, 94.5 D; 330/4.3

[56] References Cited

U.S. PATENT DOCUMENTS 4,099,140  7/1978  Snelling et al. ............... 331/94.5 G

OTHER PUBLICATIONS

Arnold et al., "A Purely Chemical HCl Laser," *Applied Physics Letters,* vol. 30, No. 12, 15 Jun. 1977, p. 637.

*Primary Examiner*—James W. Davie
*Attorney, Agent, or Firm*—Murray and Whisenhunt

[57] ABSTRACT

A continuous wave hydrogen bromide (HBr) chemical laser is described, in which laser activity is produced by purely chemical means. Gaseous chlorine dioxide and gaseous nitric oxide are mixed and reacted to produce atomic chlorine. The atomic chlorine is reacted with gaseous molecular bromine to generate atomic bromine. The atomic bromine is reacted with gaseous hydrogen iodide to generate vibrationally excited hydrogen bromide by purely chemical means. The vibrationally excited hydrogen bromide is initially formed in such a way that the population of some of the energy states is inverted. The vibrationally excited HBr is itself lased in an optical resonator cavity, or may be used to transfer energy to another gas, such as carbon dioxide, for lasing action of that other gas. The present apparatus provides a flow channel, and separate injectors and injection means for the gaseous reactant materials chlorine dioxide, nitric oxide, bromine molecules and hydrogen iodide. A laser cavity whose central axis is positioned at about 90° to the directional gas flow is located 1 cm downstream from the hydrogen iodide injectors.

8 Claims, 2 Drawing Figures

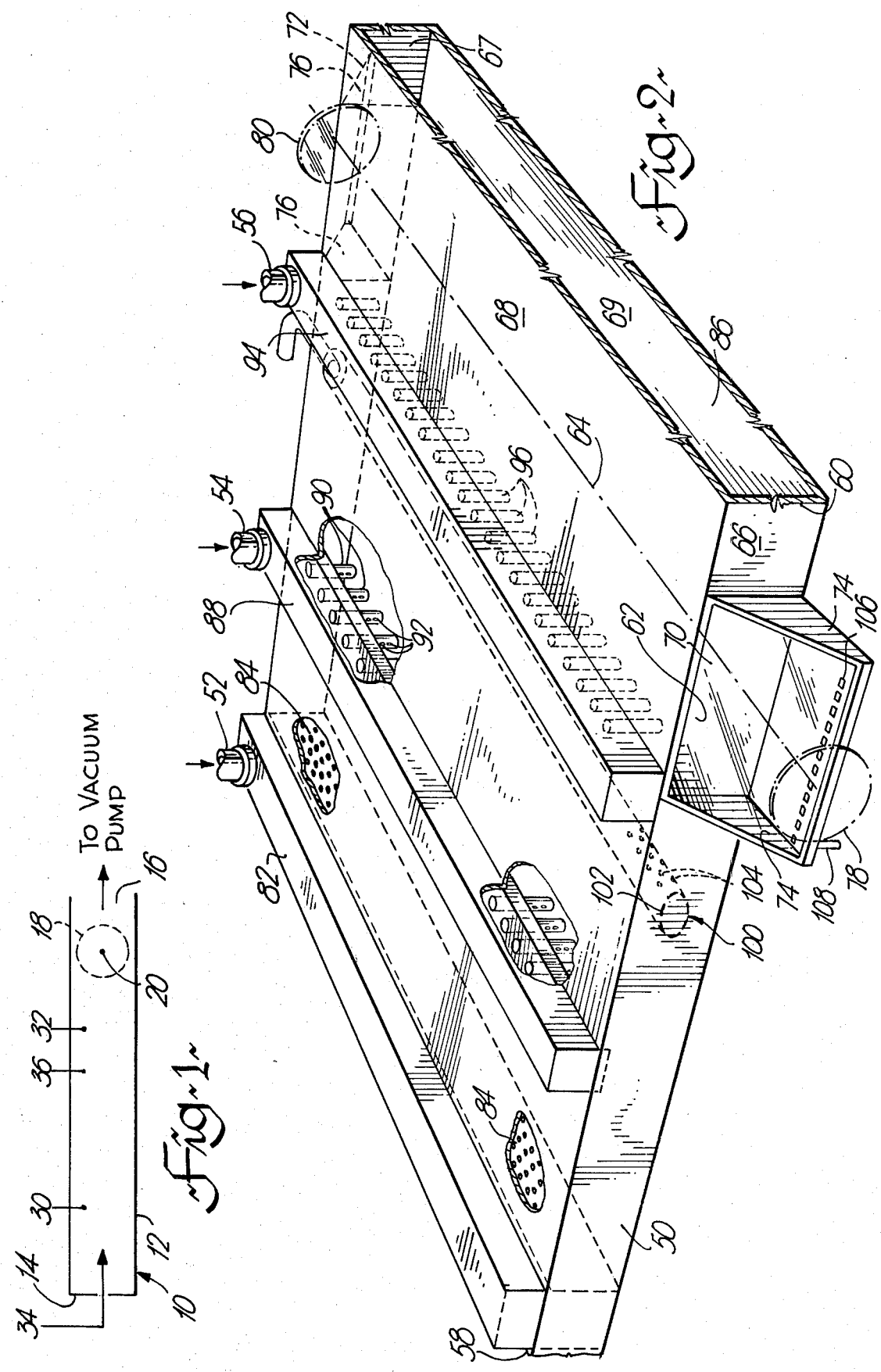

LASER EMISSION FROM PURELY CHEMICALLY GENERATED VIBRATIONALLY EXCITED HYDROGEN BROMIDE

BACKGROUND OF THE INVENTION

This invention relates to a method and apparatus for providing continuous wave laser activity by purely chemical means. Gaseous chlorine dioxide and gaseous nitric oxide are reacted in a system of flowing gases, to provide atomic chlorine. Gaseous molecular bromine is introduced into this system of flowing gases and reacts with the atomic chlorine to produce atomic bromine. Further, gaseous hydrogen iodide is introduced into the system of flowing gases to react with the atomic bromine, thereby generating vibrationally excited hydrogen bromide (HBr). The hydrogen bromide may be lased directly at approximately 4 $\mu$m, or alternatively, the HBr may be used to transfer energy to another gaseous medium, such as carbon dioxide, to cause subsequent lasing of that gaseous medium. Transverse flow laser apparatus adapted to implement the chemical reactions and systems described herein makes up another aspect of the present invention.

SUMMARY OF THE PRIOR ART

The reader should note initially, that the purposes of the present patent specification, a chemical laser is defined as laser apparatus in which a gaseous lasing medium is derived solely from exothermic chemical reactions. In other words, no input of energy is required from outside of the present apparatus, either to generate the reactive constituents therein, or to sustain the reactions occurring. It is accepted, however, that energy is normally required to provide some of the input materials to the laser apparatus in the gaseous state, as well as to exhaust the spent reagents from the laser apparatus.

The reactions required in operating a continuous wave (CW) chemical laser are normally arranged to occur in flowing gases. In a transverse flow laser apparatus, the gases flow through an optical resonator cavity at right angles to a line connecting the mirrors of the laser apparatus. In such a flow configuration, all of the molecules along the optical axis are at generally the same stage of time development. The excited molecules of the lasing medium reach a maximum concentration at a definite time which can be calculated. Thus, the transverse flow geometry enables placement of the optical axis of the laser to be coincident with this region of maximum concentration of excited molecules of the lasing medium.

In the development of a chemical laser, as defined above, it it necessary to discover and utilize chemical reactions that generate products in an excited state. This excitation must be such as to exhibit a "population inversion" between the excited state or states, and a state lying lower in energy. Also, an optical transition (laser transition) must be possible between the two states. Many such reactions are currently known per se. The disclosure of this assignee's earlier U.S. patent application Ser. No. 667,260 filed Mar. 15, 1976, now U.S. Pat. No. 4,099,140, issued on July 4, 1978, and Canadian patent application No. 243,453 in which Drs. D. R. Snelling, R. D. Suart, and K. D. Foster are named as co-inventors, contains a description of a number of such reactions.

Those applications also mention a number of earlier patents comprising prior art of which the present inventors are aware. Other references which disclose reactions for which the above requirements can be fulfilled are as follows:

(1) T. A. Cool & R. R. Stephens, Appl. Phys. Lett. 16 55 (1970).
(2) M. J. Linevsky and R. A. Carabetta, Appl. Phys. Lett. 22 288 (1973).
(3) S. J. Arnold, K. D. Foster, D. R. Snelling and R. D. Suart, Appl. Phys. Lett. 30 637 (1977).

In brief, then, the chemical systems below are also accepted herein as being known per se:

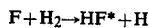
$F + H_2 \rightarrow HF^* + H$

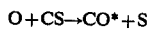
$O + CS \rightarrow CO^* + S$

$Cl + HI \rightarrow HCl^* + I$

$Br + HI \rightarrow HBr^* + I$ (The * denoting a reaction product in a vibrationally excited state).

Successful operation of all of these systems as chemical lasers was accomplished previously by discharge and/or photolytic initiation techniques. In the case of the first three of the above reactions, purely chemical lasers have been developed in which purely chemical means are used to generate the required atomic fluorine, oxygen or chlorine (Ref. 1, 2, 3 above).

The achievement of chemical laser operation based on the generation of vibrationally excited HBr was heretofore accomplished by initially generating an atomic species by electrical means. One such system relied upon the flash photolytic break-up of molecular bromine, in the presence of HI to initiate HBr laser emission at ~4 $\mu$m, see the following reference:

H. L. Chen, J. Chem. Phys. 55 5551 (1971).

To date, initiation of lasers based on vibrationally excited HBr has been accomplished by some external energy source. Depending on the size of the device this may require the use of large electrical power supplies.

SUMMARY OF THE INVENTION

The present invention is embodied in both a method for producing continuous wave chemical laser activity derived from vibrationally excited hydrogen bromide, and in a laser apparatus adapted to carry out such a method by purely chemical means. Accordingly, there is provided by one aspect of this invention a method for producing continuous wave chemical laser activity consisting of: injecting gaseous nitric oxide from a first injector into a flow path upstream from an optical resonator cavity in which the laser activity occurs; separately injecting gaseous chlorine dioxide, gaseous bromine and gaseous hydrogen iodide into the flow path upstream, from the optical laser cavity, whereby the flow path contains a mixture of the reactant gases of hydrogen iodide, bromine, nitric oxide, and chlorine dioxide, in which the nitric oxide reacts with the chlorine dioxide to produce chlorine atoms; and, molecular bromine reacts with the chlorine atoms thereby generating atomic bromine, the injection of the molecular bromine occurring at a location in the mixture of reactant gases at which sufficient production of chlorine atoms has occurred and before a predetermined quantity of the chlorine atoms has dissipated. The atomic bromine reacts with the hydrogen iodide to produce vibrationally excited hydrogen bromide purely chemically, the vibrationally excited hydrogen bromide being initially formed in such a way that the population of some energy states is inverted, thereby to enable subsequent laser activity, the sequence of injection of the hydrogen iodide being such that the reaction of the hydrogen iodide with the bromine atoms is in a time period which is sufficiently long for adequate production of bromine atoms to have occurred and is less than the time period for a loss of 63% of the bromine atoms by recombination into bromine molecules.

In a more preferred embodiment of the invention, chlorine dioxide is injected upstream of the nitric oxide, the nitric oxide upstream of the bromine and the bromine upstream of the hydrogen iodide.

In yet another embodiment of this invention, the above method provides volume of gaseous chlorine dioxide to nitric oxide to bromine to hydrogen iodide in the approximate ratios of 1:2:1:1 in the flow path.

In accordance with another aspect of this invention there is provided a continuous wave chemical laser apparatus which comprises a channel defining a confined flow path, the channel, in use, containing a gaseous mixture which consists of the reactant gases hydrogen iodide, bromine, nitric oxide and chlorine dioxide; an optical resonator cavity disposed in the flow path and having a central axis extending transversely of the channel; supply means for supplying the said reactant gases hydrogen iodide, bromine, nitric oxide and chlorine dioxide, the gases being respectively contained in the supply means; generating means for generating an excited gaseous lasing medium, the generating means consisting of first injecting means for injecting the nitric oxide into the channel flow path upstream of the optical cavity, and second separate injecting means for separately injecting the hydrogen iodide, gaseous bromine and the chlorine dioxide into the channel flow path upstream of the optical cavity, whereby the nitric oxide reacts with the chlorine dioxide to produce chlorine atoms, the generating means further consisting of another injecting means for injecting gaseous molecular bromine into the flow path upstream of the optical cavity, whereby to react the chlorine atoms with the molecular bromine to produce atomic bromine, and whereby the atomic bromine reacts with the hydrogen iodide to generate purely chemically vibrationally excited hydrogen bromide initially formed in such a way that the population of some of the energy states are inverted, for subsequent chemical laser activity; and the sequence of injection of the hydrogen iodide being such that the reaction of said hydrogen iodide with the bromine atoms is in a time period which is sufficiently long for adequate production of bromine atoms to have occurred and is less than the time period of 63% loss of the bromine atoms by recombining into bromine molecules; and exhaust means for exhausting gases from the flow path downstream of the optical cavity.

In one particular form of apparatus, the laser axis, i.e., the longitudinal axis of the optical resonator cavity is located a distance of one centimeter downstream from an axis along which the hydrogen iodide injectors are located.

In accordance with the present invention, atomic bromine, Br, is generated by reacting molecular bromine with chemically generated atomic chlorine. The atomic bromine is produced by the well known fast reactions:

$$Cl + Br_2 \rightarrow ClBr + Br \qquad (1)$$

$$Cl + ClBr \rightarrow Cl_2 + Br \qquad (2)$$

The chemical kinetics of these flow systems are known per se. See, for example, a paper in which M. A. A. Clyne and H. W. Cruse are co-authors, and published by J. Chem. Soc., Faraday Trans. II, 68, 1377 (1972). It will suffice here to state that for reaction (1) above, the rate coefficient is $1.2 \times 10^{-10} cm^3 sec^{-1}$; and that for equation (2), the rate coefficient is $1.45 \times 10^{-11} cm^3 sec^{-1}$.

The bromine atoms subsequently react with gaseous hydrogen iodide to produce the vibrationally excited hydrogen bromide. This entire reaction sequence was carried out sequentially in a flow system that yielded continuous wave (CW) laser emission.

BRIEF DESCRIPTION OF THE DRAWINGS

Various aspects of this invention will be better understood by reference to the accompanying drawings, in which:

FIG. 1 is a schematic view, not to scale, illustrating a continuous wave transverse flow laser apparatus in which vibrationally excited hydrogen bromine is produced and used for laser activity; and FIG. 2 is a perspective view, also not to scale, illustrating one form of laser apparatus embodying one aspect of this invention.

DETAILED DESCRIPTION OF THE PREFERRED EMBODIMENTS

Turning now to a more detailed description of this invention, FIG. 1 illustrates schematically one form of laser apparatus 10 which embodies this invention and provides continuous wave chemical laser activity. In brief, this laser apparatus 10 includes a housing or channel 12 through which the reactant gaseous materials are caused to flow. This channel or housing 12 has an upstream end 14 and a downstream end 16. The downstream end 16 is in flow communication with a vacuum pump or other such pump means, not shown. Such pump/pump means achieve and maintain the desired flow of gases through the channel 12. The pumping apparatus is well known per se in the laser art and does not require further description here. An optical resonator cavity 18 is formed whose axis 20 is located at a predetermined distance along the length of the channel 12. The optical cavity 18 has a central axis 20 extending longitudinally thereof and at approximately right angles to the housing or channel 12. This optical cavity 18 is terminated at opposite ends thereof with Brewster angle windows and provided with a pair of laser mirrors, both of which are known per se in this art and not illustrated here.

One of the mirrors, is, for example, a spherical front-surface totally reflecting laser mirror of the type known as a protected metal germanium mirror. That is, the germanium is impervious to chemical contamination by the atmosphere. Such a mirror is mounted with conventional alignment means, again well known per se in the laser art. In a similar manner, the other mirror, for example, is a spherical front-surface or planar front-surface, partially transmitting laser mirror of, for example, 2% transmission. The partially transmitting mirror may be a dielectric-coatd calcium fluoride flat and is mounted with adjusting means for adjusting alignment of that mirror relative to the other mirror. Again, these assemblies are well known per se, and the above brief description will suffice for present purposes.

In accordance with this invention, the channel or housing 12 defines a confined flow path through which a gaseous mixture of the reactant materials is conducted. Accordingly, conventional supply means are provided to supply the reactant gases of hydrogen iodide, bromine nitric oxide, and chlorine dioxide. Such supply means are known in this art, and a brief description of a typical supply means has been provided in this assignee's earlier application identified above. It is to be noted, though, that the supply of gaseous hydrogen iodide, bromine and chlorine dioxide involves using helium as an inert carrier gas. A further description of such supply means is not required at this time for an understanding of the present invention.

The use of inert helium is advantageous for two reasons. Firstly, it enables operation of a chlorine dioxide generator at atmospheric pressure, since, to avoid the risks of an explosion, the chlorine dioxide pressure should be less than 60 torr. It is thus desirable to include a flow of an inert gas through the ClO₂ generator. Furthermore, for a given fixed pressure of ClO₂, the presence of an inert diluent gas reduces the risk of explosions. A second advantage is derived from the inert gas functioning generally as a heat sink. It is to be noted that efficient lasing action requires that the potential temperature rise due to heat liberated from the various reactions, be reduced. Thus, the inert carrier gas absorbs and removes heat generated by the chemical reactions which occur.

In accordance with the present invention, generating means are provided for generating vibrationally excited hydrogen bromide purely chemically. Such generating means includes a first injector assembly shown at 30 in FIG. 1, for injecting gaseous nitric oxide into the channel flow path. The generating means also includes a second injector assembly separate from the injector assembly 30. In the embodiment of FIG. 1, the second injector assembly includes injectors 32, 34 and 36 spaced apart longitudinally with respect to the channel 12. The injector 34 is in flow communication with the upstream end 14 of the channel or housing 12.

The injector assembly 30 functions to inject gaseous nitric oxide into a flow path in the channel 12, upstream from the optical resonator cavity 18. The injectors 32, 34 and 36, respectively, function to inject gaseous hydrogen iodide, gaseous chlorine dioxide, and gaseous bromine also into the flow path in the channel 12, and again upstream from the optical resonator cavity 18.

Each of the injectors or injector assemblies 20, 32, 34 and 36 is locate upstream from the optical resonator cavity 18 in which laser activity occurs. The injection of molecular bromine into the mixture of reactant nitric oxide and chlorine dioxide in the flow path must occur at a location at which a sufficient production of chlorine atoms has occurred and before a predetermined quantity of chlorine atoms has dissipated, i.e., recombined as chlorine molecules. The hydrogen iodide is injected at a location at which the molecular bromine has been converted by the chemical activity of the chlorine atoms to atomic bromine and before a predetermined quantity of the bromine atoms has dissipated, i.e. recombined as bromine molecules.

Accordingly, it has been determined for the NO-ClO₂ reaction, the time required for 90% completion of that reaction is given by:

$$T_r = \frac{D}{V} = \frac{5 \times 10^{11}}{[ClO_2]} \qquad (3)$$

where
$T_r$ is the reaction time in seconds for 90% completion of the reaction;
D is the distance along the flow line following introduction of the nitric oxide into the chlorine dioxide flow, required for 90% completion of the reaction;
V is the average linear velocity of flow of the reagents in cm/sec;
$[ClO_2]$ is the initial concentration of chlorine dioxide in molecules per cubic centimeter.

Once the chlorine atoms are obtained, it is necessary to react them with molecular bromine before the free chlorine atoms recombine into chlorine molecules. A useful working time period may be taken as one in which the required reaction time is appreciably less than the time required for 63% loss of chlorine atoms (a 63% loss corresponds to a remaining concentration which is 1/e times the initial concentration, where e is the base of natural logarithms). The time for 63% loss of chlorine atoms has been calculated from the rate constants for the loss processes to be given by the following relationship:

$$T_{Cl} = \frac{2.2 \times 10^{13}}{[ClO_2] \cdot P} \qquad (4)$$

where
$T_{Cl}$ is the time for 63% loss of chlorine atoms;
$[ClO_2]$ is the initial concentration of chlorine dioxide in molecules per cubic centimeter; and
P is the total pressure prevailing in the reaction chamber, in torr.

Optimally, the following relationship should prevail:

$$T_r < T_f < T_{Cl} \qquad (5)$$

where
$T_r$ is the time for 90% completion of the reaction of nitric oxide with chlorine dioxide;
$T_f$ is the actual flow time of NO with ClO₂ permitted in the apparatus before the Cl atoms are utilized; and
$T_{Cl}$ is the time for 63% loss of chlorine atoms.

(In practice, a flow time $T_f$ about equal to or just greater than $T_r$ and less than one-fifth of the time for 63% loss has been considered to be reasonably satisfactory).

While the foregoing relationships have been determined on theoretical grounds, such empirical investigations as have been made to date do indicate that they are reasonably accurate. However, it is possible that further empirical studies will reveal that the above equations and relationships have to be adjusted to a limited extent for optimum laser performance.

The next significant reactions involve the atoms of chlorine and the molecules of bromine, from which bromine atoms are produced. To achieve this the injection of molecular bromine must occur such that bromine molecules are mixed and flowing with the chlorine atoms. This must occur for a time sufficient to enable generation of an adequate supply of bromine atoms before such bromine atoms are utilized in reacting with the hydrogen iodide. Optimally, therefore, a time relationship should exist similar to equation (5) above, namely that $$T_r < T_{fCl} \approx T_{fBr} < T_{Cl} \approx T_{Br} \quad (6)$$

where
- $T_r$ is the time for 90% completion of the reaction of nitric oxide with chlorine dioxide;
- $T_{fCl}$ is the actual flow time of the nitric oxide with chlorine dioxide permitted in the apparatus before the chlorine atoms are utilized;
- $T_{fBr}$ is the actual flow time of bromine molecules with chlorine atoms before the bromine atoms are utilized;
- $T_{Cl}$ is the time for 63% loss of chlorine atoms; and
- $T_{Br}$ is the time for dissipation of bromine atoms to molecular bromine, i.e. the decay time characteristic of bromine.

The last significant reaction in the present chemical system is that of the bromine atoms with the hydrogen iodide. The hydrogen iodide should, according to the above governing considerations, be introduced at the end of the indicated flow time before any appreciable loss of bromine atoms has occurred. K. Bergmann, S. R. Leone and C. B. Moore (J. Chem. Phys. 63 4161 (1975)) have stated that the rate coefficient for the reaction Br+HI→HBr+I is $(1.0\pm0.3)\times10^{-11}$ cm$^3$ sec$^{-1}$. Since this reaction of the hydrogen iodide with the atomic bromine is very fast, the governing consideration is not the reaction speed but the mixing time, and the relaxation time of the vibrationally excited hydrogen bromide. In other words, it is necessary to make use of the excited hydrogen bromide produced before its vibrational energy is dissipated.

From the limited available data relating to the relaxation of vibrationally excited HBr (hydrogen bromide), it is predicted that self relaxation of the excited HBr can be considered to be substantially complete within a predetermined time $T_{HBr}$ given qualitatively by the expression:

$$T_{HBr} = \frac{1}{C_{rr_{HBr}}} [HBr^+] \quad (7)$$

where
- $[HBr^+]$ is the concentration of excited hydrogen bromide in molecules per cubic centimeter, and
- $C_{rr_{HBr}}$ is the estimated rate constant for the relaxation of excited hydrogen bromide. The quantitative value of this rate constant of self relaxation is dependent upon the rates of relaxation of the different energy states which are vibrationally excited. It is expected that $C_{rr_{HBr}}$ will be of the same order of magnitude as $K_{u_{HBr}}$ where $K_{u_{HBr}}$ is the rate coefficient for process.

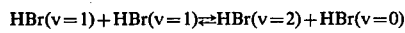
HBr(v=1)+HBr(v=1)⇌HBr(v=2)+HBr(v=0)

B. M. Hopkins and H. L. Chen (Chem. Phys. Lett. 17 500 (1972)) have stated that the value of $K_{u_{HBr}}$ is $4.5\times10^{-12}$ cm$^3$ sec$^{-1}$. The value of the rate coefficient $K_{u_{HBr}}$ is comparable in magnitude to that of $K_{u_{Hcr}}$, the rate coefficient for the reaction:

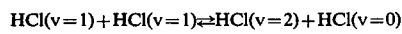
HCl(v=1)+HCl(v=1)⇌HCl(v=2)+HCl(v=0)

which has a value of $4.3\times10^{-12}$ cm$^3$ sec$^{-1}$, according to B. M. Hopkins and H. L. Chen (J. Chem. Phys. 57 3816 (1972)).

Since we require the actual flow time between the introduction of hydrogen iodide and the arrival of the gas at the optical centre of the laser cavity to be substantially less (say 1/5 or less) than the above-identified relaxation time $T_{HBr}$, we can derive an upper limit to the actual flow time between the source of the hydrogen iodide and the optical axis. This flow time of course is equal to the distance between the hydrogen iodide injector and the optical axis of the cavity, divided by the average linear flow velocity. Since this flow velocity however has been previously established in relation to the distance between the nitric oxide injector and the hydrogen iodide injector, it is possible to derive, for a given concentration of reagents, the relationship between the distance of the nitric oxide injector from the hydrogen iodide injector on the one hand and the distance of the hydrogen iodide injector from the laser optical axis on the other hand. The actual relationship will depend upon the relationship chosen between the actual flow times and the times required for 63% loss of relevant constituents.

The entire reaction sequence is carried out sequentially in a mixture of flowing gases and yields continuous wave chemical laser activity in the optical resonator cavity 18. It is desirable to maximize the concentration of vibrationally excited hydrogen bromide in the flow path of channel 12 at a location generally coincident with the central axis 20 of the optical cavity. Thus, the position of the injector assembly 32 (for hydrogen iodide) will be only a short distance upstream from the axis of the optical cavity. This location will normally be within a few centimeters of the axis 20, and preferably in the order of about one (1) centimeter.

With laser apparatus as illustrated schematically at 10 in FIG. 1, continuous wave chemical laser emission has been obtained on three vibration-rotation transitions of hydrogen bromide, HBr. These are the P$_{1-0}$ (4), P$_{1-0}$ (5) and P$_{1-0}$ (6) transitions.

A preferred form of apparatus embodying the present invention will now be described with reference to FIG. 2. In that Figure, a laser apparatus with conduits 52, 54 and 56 is adapted to be placed in flow communication with supplies of the required gaseous reagents or reactant materials. The housing 50 is generally rectangular in cross-section, and includes an upstream end 58 and a downstream end 60. The upstream end 58 normally extends slightly beyond the area at which conduit 52 communicates with the channel 50, and closes that end of the channel. The downstream end 60 is adapted to be in flow communication with a liquid nitrogen-cooled cold trap and subsequently a pumping apparatus, both of which are of conventional design known in this art. A detailed description of those devices is not needed for an understanding of the present invention. It will suffice to indicate merely that the cold trap serves to remove the condensible gases in the mixture of gases passed through the channel 50. Thereafter, the noncondensible gases flow into a conventional vacuum pump or other pumping apparatus.

Toward the downstream end 60 of the channel 50, there is provided a laser cavity or optical resonator cavity 62. This optical resonator cavity 62 has a central axis 64 extending longitudinally thereof, and is disposed at approximately 90° to the longitudinal axis of the rectangular housing 50. Being rectangular, the channel 50 has parallel side walls 66 and 67, and flat parallel top and bottom walls 68 and 69. As constructed, the side walls 66 and 67 are of "Teflon"* coated stainless steel spaced apart by 40 centimeters, while the top and bottom walls 68 and 69, also of "Teflon"* coated stainless steel, were spaced apart by one (1) centimeter.
*A trademark for a polytetrafluoroethylene, manufactured by the Dupont Company.

Opposite ends of the optical resonator cavity 62 are limited by two mutually opposed and inclined windows 70 and 72. These windows 70 and 72 are inclined at the Brewster angle with respect to the parallel top and bottom surfaces 68 and 69 of the housing 50. This minimizes the reflection of light by the windows 70 and 72. These windows 70 and 72 are supported on wing walls 74 and 76 respectively. Further, conventional sealing means of the O-ring type are provided to seal the windows 70 and 72 to the wing walls 74 and 76. Those wing walls 74 and 76 are, as seen from FIG. 2, fixedly secured to side walls 66 and 67 respectively. Two oppositely positioned laser mirrors 78 and 80 are also provided in operative relation to the optical resonator cavity 62. These mirrors 78 and 80 are each circular, and mounted so as to have their centers coincident with the axis 64 of the optical resonator cavity 62. The mounting means and adjustment assemblies for each of the mirrors 78 and 80 are conventional, and need not be illustrated or described for an understanding of the present invention.

Implementation of the present invention in accordance with the apparatus of FIG. 2 will now be described. The conduit 52 is adapted to be in flow communication with a supply of gaseous chlorine dioxide (hereinafter $ClO_2$). This supply is conveniently a $ClO_2$ generator of the type described, for example, with reference to FIG. 2 of the above-identified U.S. patent application of this assignee. As noted previously, the gaseous $ClO_2$ is conveniently conveyed by a suitable inert carrier gas, preferably helium. The mixture of $ClO_2$ and helium enters a plenum chamber 82 at a suitable pressure, for example, about 50 torr. This gaseous mixture escapes through a perforated baffle plate 84 which extends completely across the channel 50. The gases pass through the baffle plate 82 into the upstream end of a flow channel 86 in which the pressure is much lower, for example, about 3.5 torr. This reduced pressure is maintained by the pumping means mentioned earlier that is in communication with the downstream end 60 of the housing 60. The baffle plate 84 is made of "Teflon"*. An array of small holes is drilled into that baffle plate 84. These holes are, for example, of a one millimeter diameter. It will be recognized that the baffle plate 84 functions to constrict the flow prior to entry into the flow channel 86, and produces a uniform flow pattern in the channel.
*A Trademark The conduit 54 is connected to a supply of gaseous nitric oxide. A metered flow of the gaseous nitric oxide is conducted through the conduit 54 into a plenum 88 in which there is provided a series of tubular injectors 90. Each tubular injector 90 is made of stainless steel and is provided with a multiplicity of holes or openings 92. These openings 92 are, for example, approximately 0.3 millimeters in diameter and are positioned so as to direct the flow of injected gas into the flow channel 86 at substantially right angles to the primary flow of gaseous materials flowing in this channel. It is to be recognized, of course, that for purposes of illustration, the needles 90 and holes 92 are on a greatly exaggerated scale. In the embodiment here illustrated, sixty-two (62) injector tubes 90 were provided in the plenum 88, with eleven (11) holes 92 in each such needle. The pressure of the gaseous nitric oxide in the plenum 88 is preferably maintained sufficiently high that the NO flows through the holes 92 at near sonic velocities. Such high velocity injection of the gaseous NO promotes efficient gas penetration and mixing in the flowing gases in the channel 86.

Following the injection of gaseous nitric oxide into the gas flow in channel 86, the gaseous mixture flows downstream a further distance until the reaction

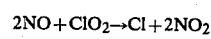

$$2NO + ClO_2 \rightarrow Cl + 2NO_2$$

has reached a satisfactory state of completion. This distance is designed with respect to the time required for 90% completion of the NO-$ClO_2$ reaction, as well as the time period in which the required reaction time is appreciably less than the time required for 63% loss of chlorine atoms. This time criteria will be familiar to those knowledgeable in the chemical kenetics of these reactions, and is described on pages 11, 12 and 13 of this assignee's above-mentioned U.S. patent application.

At a predetermined distance downstream from the nitric oxide injector is an arrangement for injecting gaseous hydrogen iodide into the flow stream in channel 86. A supply of gaseous hydrogen iodide is conducted by conduit 56 into a plenum 94. Plenum 94 is constructed with a multiplicity of tubular injectors 96, and these are constructed in a manner basically identical to the plenum and tubular injectors 88 and 90 previously described. In other words, the array of hydrogen iodide injectors is essentially identical to the array of nitric oxide injectors.

The injector array for hydrogen iodide is immediately upstream of the optical resonator cavity 62. Furter, there is also provided in accordance with this invention an injection means 100 for injecting gaseous molecular bromine into the mixture of flowing gases in the channel 86. Accordingly, a tube 102 is provided, extending across the channel 86, and being supported at opposite ends by side walls 66 and 67. The tube 102 is tubular in cross-section, preferably elliptical and made of "Teflon"*. The major axis of the elliptical tube 102 extends transversely of and parallel to the channel 86. This tube 102 has a downstream portion in which there is provided a multiplicity of holes or openings 104. These holes are approximately 0.3 millimeters in diameter each, and are provided in three uniformly spaced rows. The central row of holes 104 extends generally parallel to the major axis of the elliptical tube 102, with the other two rows of holes being spaced equally from that central row on opposite sides thereof. The holes 104 in the two outermost rows are uniformly staggered with respect to the central row of holes lying in the plane of the major axis of tube 102. These holes 104 extend completely over the length of the tube 102, and in this instance, numbered 40 holes per row.
*A Trademark The injector means 100 is adapted to be in flow communication by suitable conduit and metering devices with a generator of molecular bromine, i.e. molecules of bromine in a gaseous state. The precise nature of such a generator is not described and is not important to an understanding of this invention. It will suffice simply to state that a convenient apparatus provides molecules of bromine in a gaseous state for injection via the perforated tube 102 into the flow channel 86. It will be apparent, of course, that the volumetric rate of supply of molecular bromine will be sufficient to ensure the continuous injection of the bromine molecules into the mixture of gases uniformly in the channel 86. Immediately past the location of the hydrogen iodide injector, the mixture of reactant gaseous materials flow into the optical resonator cavity 62. It will be seen from FIG. 2 that a dead gas space is formed by the mounting of windows 70 and 72 on the wing walls 74 and 76. This dead gas space is purged out, also with helium entering through slots 106 extending across the resonator cavity 62, and being fed from a supply conduit 108. This purging action prevents spent gases from accumulating in the dead gas space and contributing to optical losses of the laser cavity. Further yet, the flowing helium serves to keep the interior window surface free from particulate matter or other deposits that might otherwise lodge there.

In accordance with the present invention, atomic bromine, Br, is generated by reacting the gaseous molecular bromine with atomic chlorine generated chemically by the well known reactions described with this assignee's above-mentioned U.S. patent application. In brief, the gaseous nitric oxide reacts with the gaseous chlorine dioxide to produce chlorine atoms. These chlorine atoms then react with the molecular bromine according to the well known fast reactions $$Cl_2 + Br_2 \rightarrow ClBr + Br$$

$$Cl + ClBr \rightarrow Cl_2 + Br$$

The bromine atoms react with the hydrogen iodide injected in the gaseous state into the flow channel 86. This reaction then produces vibrationally excited hydrogen bromide by purely chemical means. The entire reaction sequence is carried out sequentially in a chemical system of flowing gases in the channel 86 to yield continuous wave laser activity within the optical resonator cavity 62.

In the embodiment illustrated in FIG. 2, a maximum power output of 0.5 watts has been obtained on three vibration-rotation transitions of the excited hydrogen bromide (HBr). These are the $P_{1-0}$ (4), $P_{1-0}$ (5) and $P_{1-10}$(6) transitions. It is to be noted that in the apparatus of FIG. 2, the dimensions and spacing of various structures has been exaggerated for clarity. In reality, for example, the axis 64 of the optical resonator cavity 62 was located a distance of one (1) centimeter downstream from the longitudinal axis of the array of hydrogen iodide injectors.

In the operation of the apparatus of FIG. 2, the following approximate flow conditions were utilized:

| | |
|---|---|
| Helium: | 121,600 sccm |
| ClO$_2$: | 2000 sccm |
| NO: | 4500 sccm |
| Br$_2$: | 1400 sccm |
| HI: | 1500 sccm |
| Pressure (in laser cavity): | 3.5 torr. |

The optical cavity consisted of a total reflector of 10 m radius of curvature and a 98% reflector of 4 m radius of curvature. It is noted here that for precautionary reasons the interior walls of the flow channel 86 were "Teflon"* coated and the bromine injector was made of "Teflon"*.
*A Trademark The foregoing has described a couple of forms of apparatus embodying the present invention. Certain obvious modifications will be apparent to those knowledgeable in this art, and are envisaged herein. For example, better mixing could be obtained if the bromine injector array was similar in design to the hydrogen iodide and nitric oxide injector arrays. Thus, all such modifications falling within the scope of the present invention are intended to be encompassed by the claims below.

What is claimed is:

1. A method for producing continuous laser activity comprising:
    injecting reactant gases consisting essentially of nitric oxide, chlorine dioxide, hydrogen iodide, and molecular bromine in a flow path upstream from an optical resonator cavity in which said laser activity occurs, whereby the nitric oxide reacts with the chlorine dioxide to produce chlorine atoms, the molecular bromine reacts with the chlorine atoms to generate atomic bromine, and the atomic bromine reacts with the hydrogen iodide to produce vibrationally excited hydrogen bromide, purely chemically; and
    provided that the nitric oxide is injected separately from the chlorine dioxide, the said vibrationally excited hydrogen bromide is initially formed so that the population of some energy states is inverted so as to enable subsequent chemical laser activity and the sequence of injection of hydrogen iodide is such that the reaction of said hydrogen iodide with the atomic bromine is in a time period which is less than the time period for a loss of 63% of the atomic bromine by recombing into molecular bromine.

2. The method defined in claim 1, wherein the injecting of gaseous nitric oxide, chlorine dioxide, gaseous bromine and gaseous hydrogen iodide occurs at locations spaced apart in the flowpath, upstream from the optical laser cavity.

3. The method defined in claim 1, wherein the nitric oxide is injected into said flowpath at a location intermediate the injection of gaseous chlorine dioxide and the gaseous molecular bromine, upstream from the injection of said gaseous hydrogen iodide.

4. The method defined in claim 1, wherein the volumes of gaseous chlorine dioxide to nitric oxide to bromine molecules to hydrogen iodide are approximately in the ratios of 1:2:1:1 in said flowpath.

5. The method defined in claim 3, wherein the optical resonator cavity is maintained, in use, at a pressure of about 3.5 torr.

6. The method defined in claim 1, wherein gaseous helium is used as an inert carrier for the gaseous chlorine dioxide, the gaseous bromine and the gaseous hydrogen iodide.

7. A continuous wave chemical laser apparatus comprising:
    (a) a channel defining a confined flowpath, said channel, in use, containing a mixture of reactant gases consisting essentially of hydrogen iodide, molecular bromine, nitric oxide and chlorine dioxide;
    (b) an optical resonator cavity disposed in the said flowpath and having a central axis extending transversely of said channel;
    (c) supply means for respectively containing and supplying the said reactant gases;

(d) injecting means for injecting the reactant gases hydrogen iodide, nitric oxide and chlorine dioxide into the channel flowpath upstream of the optical cavity, said injecting means being capable of separately injecting the nitric oxide from the chlorine dioxide into the channel flowpath and another injection means upstream of the optical cavity for injecting the molecular bromine into the flowpath so that the nitric oxide reacts with the chlorine dioxide to produce chlorine atoms, the atomic chlorine reacts with the molecular bromine to produce atomic bromine, the atomic bromine reacts with the hydrogen iodide to generate vibrationally excited hydrogen bromide, purely chemically; and provided that the excited hydrogen bromide is initially formed so that the population of some of the energy states are inverted so as to enable subsequent chemical laser activity and the sequence of injection of the hydrogen iodide is such that the reacton of the hydrogen iodide with the atomic bromine is in a time period which is less than the time period for a loss of 63% of the atomic bromine by recombining into molecular bromine; and (e) exhaust means for exhausting gases from the flow path downstream of the optical cavity.

8. The apparatus of claim 7 wherein the injecting means includes separate injectors for each of the nitric oxide, hydrogen iodide, and the chlorine dioxide.

* * * * *